United States Patent [19]

Gutsche et al.

[11] 4,150,912

[45] Apr. 24, 1979

[54] TWIN BLADE MOUNTING AND TENSIONING APPARATUS

[75] Inventors: Henry W. Gutsche; Thomas L. Bever; John T. Hepperman, all of St. Louis, Mo.

[73] Assignee: Monsanto Company, St. Louis, Mo.

[21] Appl. No.: 871,276

[22] Filed: Jan. 23, 1978

[51] Int. Cl.² .......... B26D 1/12; B24B 7/00; B28D 1/04
[52] U.S. Cl. .......... 407/31; 51/73 R; 125/15
[58] Field of Search .......... 407/31, 47; 51/181 NT, 51/73 R; 125/15

[56] References Cited

U.S. PATENT DOCUMENTS

| 3,175,548 | 3/1965 | Weiss | 125/15 |
| 3,556,074 | 1/1971 | Nelke | 51/73 R |
| 3,762,008 | 10/1973 | Volki et al. | 407/47 |
| 3,827,421 | 8/1974 | Schumacher et al. | 125/15 |
| 4,014,311 | 3/1977 | Steere, Jr. | 125/15 |

*Primary Examiner*—Harrison L. Hinson
*Attorney, Agent, or Firm*—Henry Croskell

[57] ABSTRACT

A twin blade mounting and tensioning apparatus is disclosed wherein twin inside diameter cutting blades for sawing crystalline rod materials are mounted with annular clamping-tensioning members which clamp the twin blades between the members with the clamped twin blades having an outer annular shim and an inner annular shim located therebetween in a spaced apart relationship defining an annular fluid expansion chamber, the annular clamping-tensioning members having recessed annular chambers in circumferential alignment with and located axially outward from said expansion chamber, the expansion chamber separated from the recessed chambers by the twin blade walls which are flexible and deformable within said recessed chambers through the action of pressurized fluid means.

11 Claims, 3 Drawing Figures

TWIN BLADE MOUNTING AND TENSIONING APPARATUS

BACKGROUND OF THE INVENTION

The present invention relates to an apparatus for mounting twin annular diameter blades and in particular to a hydraulically operated blade tensioning means.

The use of extremely thin semiconductor wafers, for example, silicon wafers in the Electronics industry, typically in the order of about 0.010 inches in thickness, has been on the increase in recent years. Such wafers are usually cut from large semiconductor crystal rods drawn specifically for the purpose of providing material to be cut into these individual wafers.

The diameter of the specifically-drawn rods are approximately 3 inches or more. Uniformity of size and surface configuration of the sawed wafers is extremely important. Semiconductor materials are usually prepared by crystal growth techniques in the shape of rods. These rods must be cut into the thin wafers which then serve as substrate for semiconductor device processing. The cutting is usually accomplished by annular saws featuring a thin inside diameter blade with diamond deposits upon the cutting edge of the inner opening of the blade. These special cutting blades have been devised in order to slice thin wafer material from large diameter rods while minimizing waste of the expensive semiconductor crystal material and providing wafers which have smooth, unscarred surfaces. The achievement and maintenance of the proper tensioning of the inside diameter blade is considered a major and serious problem.

The cutting blades must be thin enough to provide a desired thin wafer while minimizing waste of material. The cutting blades must also have the rigidity to be able to slice through a 3 inch or greater diameter rod. These requirements demand a blade with the thinness and rigidity not obtainable in ordinary outside diameter cutting blades. In order to provide a cutting blade with the required characteristics of thinness, rigidity and cutting depth capability, a thin circular or annular saw blade is clamped about its circumference and an opening is provided in the center of the blade. The blade so formed is then mounted on a saw blade housing, thus forming an inside diameter cutting surface.

In earlier slicing machines mechanical means were provided for tensioning the saw blade once it was clamped. Mechanical tensioning, however, proved to be less than satisfactory as it was difficult, if not impossible, to control or predict the amount of tension which would be transimitted to various circumferential locations of the saw blade. The difficulty arose as a result of the difficult precise repeatable movement of mechanical tensioning means at specific fixed positions about the saw blade's peripheral. Further, due to the mechanical application of tensioning forces, the mechanically tensioned saw blades experienced very severe hysteresis and frictional losses. These losses contributed to the inaccuracy of the mechanical tensioning system.

More recently hydraulic blade tensioning systems have appeared on the market. In some of the systems available, the hydraulic fluid or grease which is used as the tensioning medium is contained in an annular groove in a clamping ring of the slicing machine. The grease is pressurized and forced into direct contact with a segment of the saw blade near the perhipery thereof. The pressure which is applied to the tensioning medium, in turn, impinges upon the blade and gives a significantly more predictable amount of tension for a given amount of hydraulic pressure than was possible with mechanically tensioned saw blades.

In known clamping devices, axial pressure deforms the saw blade either through hydraulic or mechanical devices. However, such devices have been considered with only one blade on the sawing head. Tension control of these single inide diameter sawing blades have been sufficiently complicated that only single blades have been attempted by the industry. Indeed, other cutting technology improvements have been considered such as enlarging the center hole of the blade because the material to be cut has been increased in diameter, and trying to speed up the cutting rate to improve productivity. These attempts have not all necessarily been successful and mutliblade cutting as a means to increase productivity has not been considered because of inherent tension control problems of single inside diameter blade sawing.

It is an object of the present invention to provide an apparatus for twin blade mounting and tensioning through pressurized fluid expansion chamber means.

Another object of the present invention is to provide a means for uniformly tensioning twin or multiple blades about their periphery and also to enable the amount of tension to be rapidly changed during continued operation, without requiring the assembly to be removed from annular clamping - tensioning members. Consequently, the present invention provides an apparatus which permits twin inside diameter saws to be retensioned during continued use and, therefore, extends the useful life of the blades while providing increased sawing productivity from, presently, in use inside diameter saw machinery.

SUMMARY OF THE INVENTION

A twin inside diameter blade mounting and tensioning apparatus is provided wherein an expansion recess is included in both clamping-tensioning members and the channel through which the tensioning fluid is introduced is located adjacent to these recesses. The twin inside diameter saw blades are installed with a pair of shims placed therebetween with an inner and outer annular shim relationship defining an annular fluid expansion chamber. These inner and outer annular shims are of the thickness which will space the blade apart sufficiently so that slices cut between the blades will be of the desired productivity thickness. The inner and outer annular shims form a concentric annular ring expansion chamber. The outer annular shim ring has an outside diameter approximately that of the saw blades and an inner diameter slightly larger than the outside diameter of the recess into which the blades will deform. The inner and outer annular shims are mounted in the same manner as the blades and will be located through communicating location stud openings.

When the twin blades are positioned and clamped, the expansion chamber and respective recess chambers are substantially aligned on either side of the outer surfaces of the twin blades. Fluid entry and exit channels are provided which are in communication with and offset from the annular fluid expansion chamber. These fluid entry and exit channels are filled with a fluid medium, such as water-soluble grease. The application of pressure to the fluid in the channel results in the pressure being transmitted through the medium and establishes unequal pressures on the twin blade through the expansion chamber. Due to the unequal pressures, the adjacent portion of the respective twin saw blades is forced to change its contour and extend into the recesses of the annular clamping-tensioning members. The fluid pressure is transmitted circumferentially and results in axial deformation of the twin blades into the recesses. Since the outer peripheral portions of the twin blades are securely clamped, the bowing of the twin blades into the recesses establishes the circumferential stresses needed for tensioning.

Due to the fact that stresses are caused by the application of pressure to the fluid and this pressure is substantially uniform about the entire expansion chamber and respective recess chambers, stresses are correspondingly uniform about the periphery of the saw blades. To increase the sensitivity of the twin saw blades to variations in the pressure applied to the fluid, a plurality of channels may be formed in the annular clamping-tensioning members. These channels are preferentially spaced about the circumference of the annular clamping-tensioning members to minimize back pressure in the recess chambers. The pressure in the expansion chamber can be varied by providing valve means at the exit channels of the channel. In addition, sealing means such as O-rings may be located in position on the annular clamping-tensioning members such as on either side of their respective recess chambers to insure that the fluid is confined to the volume formed by the deformed blade.

One perferred embodiment of the present invention comprises the utilization of an inner annular shim 25 which is wholly or partially constructed of an elastomeric material. In an alternate embodiment, an annular O-ring can be employed wherein the annular O-ring adjoins the outer diameter of inner shim 25 achieving a positive sealing of expansion chamber 42.

The magnitude of the circumferential stresses induced in the twin blades is determined in part by the distance that the blades extend into the recesses. Thus, if the blades should require retensioning after a particular period of usage, the application of additional pressure in the fluid results in a retensioning or resetting of the blades in their proper operating condition. Since the blades are clamped between the first and second annular clamping-tensioning members prior to the application of pressure to the fluid material the concentricity of the blades can be checked and adjusted if desired without requiring the insertion of new blades. In addition, the use of fluid to apply the pressure not only insures uniformity of circumferential stresses about the circumference of the blades but also eliminates any partial stresses due to a relative rotation between the blades and the tensioning members.

Further features and advantages of the invention will become readily apparent in the following detailed description of the specific embodiment when taken in conjunction with the accompanying drawings.

DESCRIPTION OF THE PREFERRED EMBODIMENT

Figure 1:
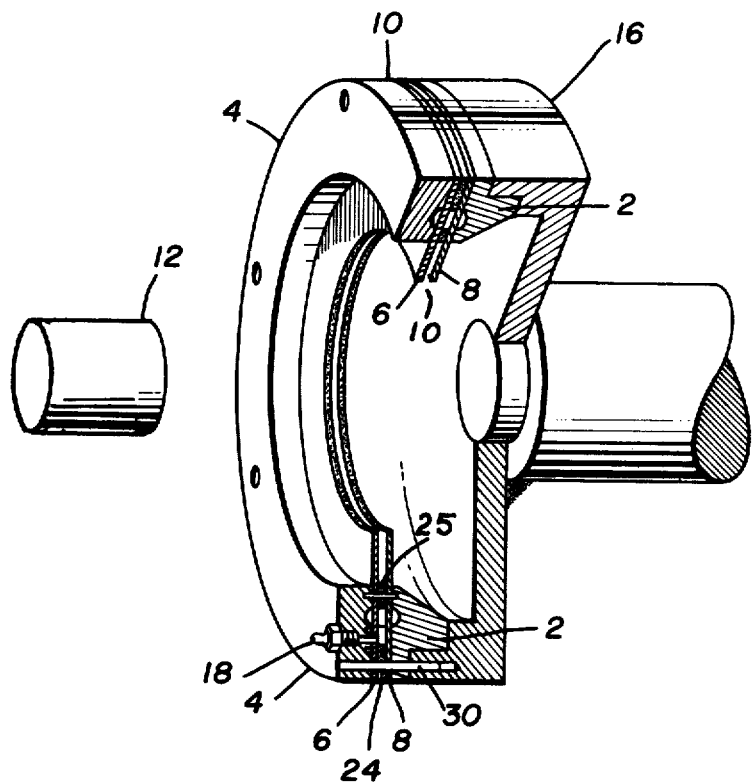
FIG. 1 is a partial sectional view of the twin saw blade housing and workpiece in a spaced apart relationship.

Referring now to FIG. 1, a hydraulically tensioned twin blade saw assembly is shown comprising tensioning ring 2, clamping-tensioning ring 4, first annular blade 6 and second annular blade 8, the first and second annular blades being formed of a thin metal, such as stainless steel, with their inner peripheral edge containing an abrasive material such as diamond. Twin annular blades 6 and 8, outer annular shim 24 and inner annular shim 25, positioned between first and second annular clamping-tensioning members 2 and 4 comprise blades-shims assembly 10 as mounted on spindle plate 16 in a spaced apart relationship to workpiece 12. The blades-shims assembly 10 has a hydraulic fluid check valve 18 communicating through a first blade 6 fluid channel 20 to an offset shim fluid channel 22 as shown in FIG. 2.

Figure 2:
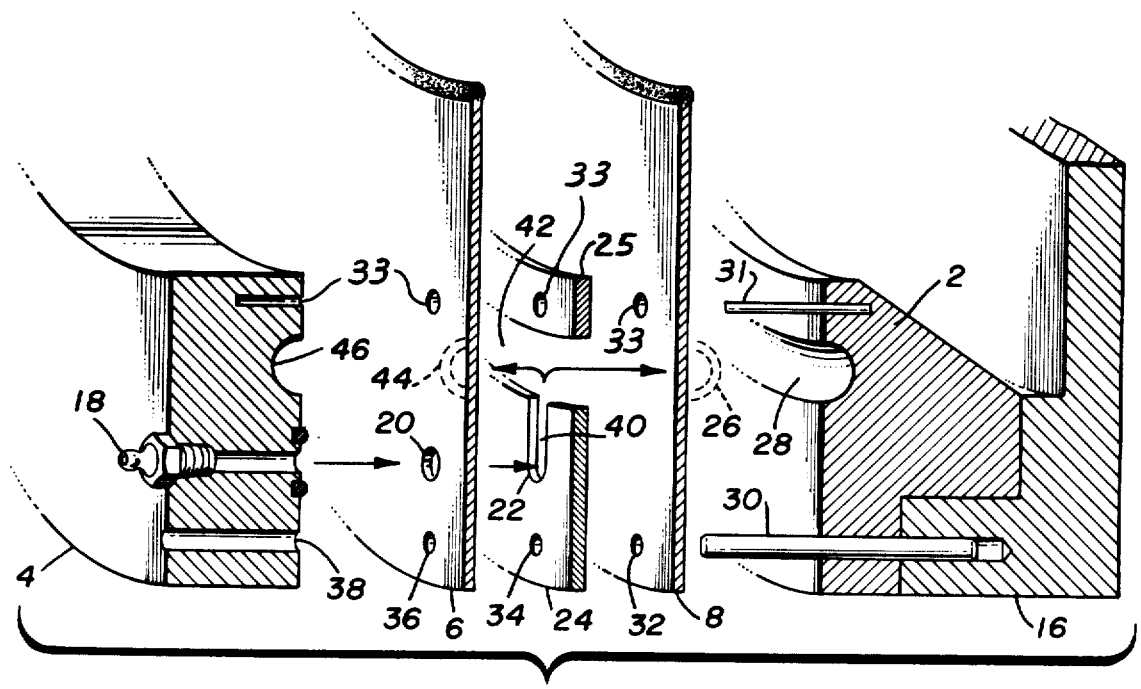
FIG. 2 is an enlarged and exploded partial sectional view of the twin saw blade housing.

The outer annular shim 24 and inner annular shim 25 as presented in FIG. 2 in cooperation with the blades-shims assembly 10 define an annular fluid expansion chamber 42. When pressure is exerted upon the fluid contained in the annular fluid expansion chamber 42, the second blade 8 is motivated to a fluid tension expansion position 26 into tensioning ring to recessed chamber 28. The blades-shims assembly 10 is arranged to maintain the expansion chamber pressures through the operations of outer locating bolt of dowel 30 and inner locating valve 31 which obviously are reproduced about the circumferential zone of the blade-shims assembly. These respective bolts and dowel assembly include second blade 8 outer bolt channel 32, inner locating dowel channels 33, outer shim-outer bolt channel 34, first blade-outer bolt 36 channel and clamping-tensioning ring outer bolt channel 38. The annular fluid expansion chamber 42 also acts in the opposite direction as a result of pressure upon the contained fluid forcing the first blade 6 into a fluid tensioning expansion position 44 which is received by clamping-tensioning ring recessed chamber 46. Blade expansion positions 44 and 26 will vary from slight deformation during early use tensioning to approximate deformation use extreme of the recesses 46 and 28.

Figure 3:
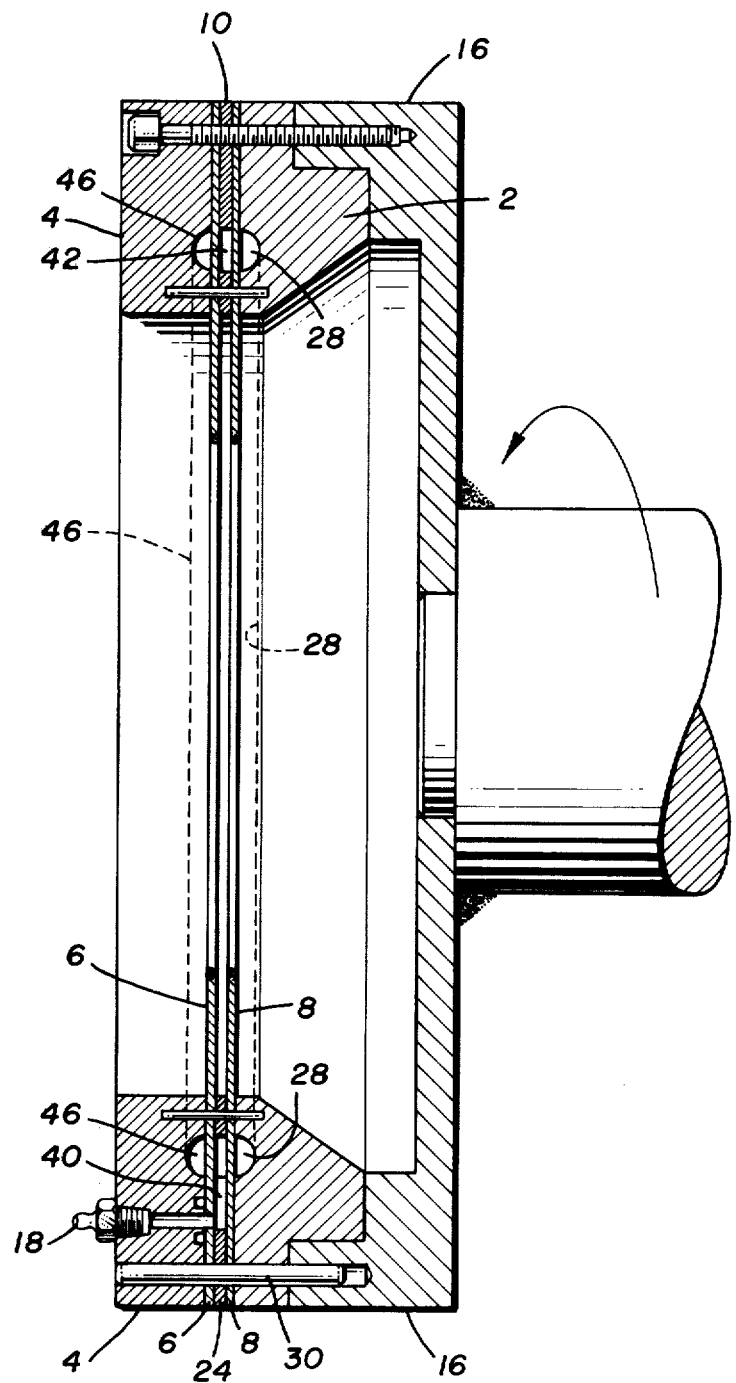
FIG. 3 is a sectional view of the multiple saw blade housing.

The recessed chambers 28 and 46 are required to be in substantial registration on either side of first blade 6 and second blade 8 when the tensioning ring 2 and clamping-tensioning ring 4 are in clamped position. In practice, the hydraulic fluid is introduced into and through hydraulic fluid check valve such as 18 through blade fluid channels which are offset but in communication with the annular fluid expansion chamber 42 through shim fluid channels 22. Not shown in the drawings would be fluid exit channels through either the first and/or second annular clamping-tensioning members i.e., tensioning ring 2 and clamping-tensioning ring 4 which would permit the stabilization of pressure upon the fluid without the effects of entrapped gas pockets. The sectional view of the twin blades housing as shown in FIG. 3 provides the apparatus according to the invention mounted on a commercial type spindle plate 16. It should be realized that the hydraulic fluid check valve 18 could easily be replaced with continuous pressure head means which would allow for continuous control and tensioning of the twin blades 6 and 8.

A preferred embodiment according to the invention is the twin blade mounting and tensioning apparatus comprising first and second annular clamping-tensioning members for clamping a first annular blade and a second annular blade, an outer annular shim and an inner annular shim located between the first and second blades, said shims being spaced apart defining an annular fluid expansion chamber between the two twin blades, said annular clamping-tensioning members in circumferential alignment and location axially outwardly from said expansion chamber confronting a first wall of each blade while said expansion chamber confronts a second wall of each blade, said annular clamping-tensioning members having annular recessed chambers in register with the fluid expansion chamber, at least one of said annular clamping-tensioning members having fluid entry and exit channels which are in communication with the annular fluid expansion chamber, said blade walls between the expansion chamber and said recessed annular chambers being flexible and deformable within said recessed chambers. Other embodiments include the adaptation of seal ring members for sealing the fluid within the annular expansion chamber such as gasket means. Multiple fluid entry and exit chamber adaptations which communicate with the annular fluid expansion chamber are also considered to be a preferred embodiment. However, the apparatus according to the invention would also include for example a single entry system with at least two exit chambers which would enhance a controllable pressure fluid expansion chamber action. An additional preferred embodiment would be the utilizaion of a constant fluid pressure means comprised of a hydraulic liquid. Preferably the recessed chambers are continuous as is the expansion chamber; however, the recessed chambers would not necessarily need to be continuous since spaced apart expansion chambers in some situations might be desirable.

In operation, the annular twin blade saw is rotated about the axis of the spindle. Then the workpiece is brought into contact with the twin blades and a slicing operation performed. After a prolonged period of operation during which many wafers are formed in pairs, the blade is normally required to be retensioned. To effect retensioning, it is only required that the pressure on the hydraulic fluid in the expansion chamber 42 be increased. Under other conditions this retensioning could be achieved through constant pressure adjustment through automation means. However, the retensioning if in a step fashion can be provided in a relatively short period without demounting the saw assembly from the spindle plate by merely introducing additional hydraulic fluid into the system. Hydraulic pressures according to the invention could approximate from about 800 to 1500 psi. After sufficient operation slicings of wafers at speeds of from about 500 to 4000 rpms, depending on twin blades can be retensioned in a step wise fashion by rod diameter restoring pressure to the system of desired levels. The subsequent cutting operations on silicon rods after retensioning should be as effective as the original tensioned twin blades since rigidity of the twin blades is restorable and the operational life of the blades would necessarily be increased.

While the above description has referred to a specific embodiment of the invention, it will be recognized that many modifications and variations may be made therein without departing from the scope of the invention.

What is claimed is:

1. A twin blade mounting and tensioning apparatus comprising first and second annular clamping-tensioning members for clamping a first annular blade and a second annular blade, an outer annular shim and an inner annular shim located between the first and second blades, said shims being spaced apart defining an annular fluid expansion chamber between the twin blades, said annular clamping-tensioning members in circumferential alignment and located axially outwardly from said expansion chamber confronting a first wall of each blade while said expansion chamber confronts a second wall of each blade, said annular clamping-tensioning members having annular recessed chambers in register with the fluid expansion chamber, at least one of said annular clamping-tensioning members having fluid entry and exit channels which are in communication with the annular fluid expansion chamber, said blade walls between the expansion chamber and said recessed annular chambers being flexible and deformable within said recessed chambers.

2. A twin blade mounting and tensioning apparatus according to claim 1 wherein the apparatus contains a fluid within the fluid expansion chamber, with the shims and blades being constructed and arranged to seal the fluid within the annular expansion chamber.

3. A twin blade mounting and tensioning apparatus according to claim 2 wherein the fluid seal is achieved through gasket means.

4. A twin blade mounting and tensioning apparatus according to claim 3 wherein the fluid seal is achieved through an annular O-ring mounted along the outside diameter of the inside annular shim.

5. A twin blade mounting and tensioning apparatus according to claim 3 wherein the fluid seal is achieved through the inside annular shim being wholly or partially constructed of an elastomeric material.

6. A twin blade mounting and tensioning apparatus according to claim 1 wherein multiple fluid entry and exit chambers communicate with the annular fluid expansion chamber.

7. A twin blade mounting and tensioning apparatus according to claim 1 wherein the fluid chamber is connected with constant fluid pressure means.

8. A twin blade mounting and tensioning apparatus according to claim 2 wherein the fluid is comprised of a hydraulic liquid.

9. A twin blade mounting and tensioning apparatus according to claim 1 wherein the annular clamping-tensioning members, twin blades, outer and inner annular shims are positioned with locating studs communicating through aligned stud receiving channels.

10. A twin blade mounting and tensioning apparatus according to claim 1 wherein the fluid entry and exit channels are offset and communicate with the fluid expansion chamber.

11. A twin blade mounting and tensioning apparatus according to claim 1 wherein the recessed chambers are comprised of continuous chamber rings.

* * * * *